United States Patent

Ableson

[15] 3,653,847
[45] Apr. 4, 1972

[54] INHIBITION OF SODIUM BICARBONATE CRYSTALLIZATION DURING CRYSTALLIZATION OF OTHER MATERIALS USING POLYPHOSPHATES

[72] Inventor: Arthur E. Ableson, Los Angeles, Calif.
[73] Assignee: American Potash & Chemical Corporation, Oklahoma City, Okla.
[22] Filed: Sept. 14, 1970
[21] Appl. No.: 72,136

Related U.S. Application Data

[63] Continuation-in-part of Ser. No. 727,709, May 8, 1968, abandoned.

[52] U.S. Cl. ..........................23/296, 23/300, 23/121, 23/59, 23/302
[51] Int. Cl. ...........................................C01d 5/00
[58] Field of Search.............23/121, 64, 302, 300, 296, 23/59, 312

[56] References Cited

UNITED STATES PATENTS 2,108,783   2/1938   Smith........................................23/300

*Primary Examiner*—Norman Yudkoff
*Assistant Examiner*—Sam Silverberg
*Attorney*—William G. Addison

[57] ABSTRACT

A process of separating a material consisting of at least one salt selected from the group consisting of sodium tetraborate and sodium sulfate from aqueous solutions containing the same and sodium bicarbonate. An alkali metal polyphosphate, such as sodium hexametaphosphate, is contacted with the aqueous solution to prevent the nucleation and crystallization of sodium bicarbonate while the material is crystallized from the solution and recovered. The sodium bicarbonate subsequently also may be recovered from the solution.

10 Claims, No Drawings

INHIBITION OF SODIUM BICARBONATE CRYSTALLIZATION DURING CRYSTALLIZATION OF OTHER MATERIALS USING POLYPHOSPHATES

This application is a continuation-in-part of my co-pending application, Ser. No. 727,709 filed May 8, 1968 now abandoned.

BACKGROUND OF THE INVENTION

1. Field of the Invention

This invention relates to a process of treating an aqueous solution containing sodium bicarbonate and a material consisting of at least one salt selected from the group consisting of sodium tetraborate and sodium sulfate. More particularly, it relates to a process of crystallizing the material substantially free of sodium bicarbonate from an aqueous solution containing said material and bicarbonate.

2. Description of the Prior Art

Borax (sodium tetraborate decahydrate) and glaubers salt (sodium sulfate decahydrate) may be recovered from aqueous brine solutions, including natural brines such as Searles Lake and Owens Lake brine, by a number of techniques. According to one commercial process, the aqueous brine solution, containing sodium tetraborate, sodium carbonate, potassium chloride, sodium sulfate and other inorganic salts, is carbonated to convert the sodium carbonate in the brine solution to relatively insoluble sodium bicarbonate which crystallizes out of the brine solution. The bicarbonate thus crystallized is filtered from the solution and subsequently converted to high purity dense soda ash. The filtrate remaining after separation of the bicarbonate crystals is then cooled to cause sodium tetraborate decahydrate and sodium sulfate to crystallize from the solution.

However, it has been found that substantial amounts of bicarbonate remain in solution after carbonation of the brine solution. As a result, when the filtrate is colled, sodium bicarbonate co-crystallizes with the desired materials to provide a solid product which may contain up to equal amounts of sodium bicarbonate and such materials. It is therefore usually necessary to further refine the crystals recovered upon cooling the filtrate in order to separate the desired materials from the bicarbonate crystals and provide a substantially pure product. In addition, the co-crystallization of sodium bicarbonate with the desired materials adversely affects the efficient recovery of sodium bicarbonate in the process.

SUMMARY OF THE INVENTION

The present invention provides a process of separately crystallizing a material consisting of at least one salt selected from the group consisting of sodium tetraborate and sodium sulfate from aqueous solutions of the same containing sodium bicarbonate. Thereafter, the sodium bicarbonate can be crystallized from the remaining solution. According to this invention, an aqueous solution, including aqueous brine solutions, containing the desired material and sodium bicarbonate is contacted with an alkali metal polyphosphate. It has been found that the alkali metal polyphosphate prevents the nucleation and crystallization of sodium bicarbonate but does not affect the crystallization of the desired material from the solution. As a result, upon cooling the solution, substantially pure crystals of the material are recovered. Sodium bicarbonate may subsequently be recovered from the brine solution by allowing the alkali metal polyphosphate to hydrolyze to the orthophosphate form and thereafter crystallizing sodium bicarbonate from the brine solution.

DESCRIPTION OF THE PREFERRED EMBODIMENTS

According to the present invention, the material substantially free of sodium bicarbonate impurities, is recovered from an aqueous brine solution containing the same and sodium bicarbonate by contacting the aqueous brine solution with an alkali metal polyphosphate prior to crystallizing the material from the solution. It has been discovered that alkali metal polyphosphates can be advantageously employed in such aqueous brine solutions to prevent nucleation and crystallization of sodium bicarbonate so that the material may be separately crystallized from the solution by conventional techniques such as, for example, by cooling the solution.

The polyphosphate compound added to the aqueous brine solution hydrolyzes slowly in the aqueous solution to the orthophosphate form, which does not prevent nucleation and crystallization of sodium bicarbonate, so that the bicarbonate may be subsequently crystallized from the brine solution. The process of this invention may be carried out in either a continuous or a batch operation.

Substantially, any aqueous solution containing the material and sodium bicarbonate may be treated according to the process of this invention. Preferably the aqueous solution is obtained by the manipulation of natural brines, such as Searles Lake and Owens Lake brine, which contain varying amounts of the material and sodoium carbonate. The aqueous solution may also contain other inorganic salts, such as for example, sodium chloride, potassium chloride, sodium sulfate and the like.

The concentration of the material and sodium bicarbonate in the aqueous brine solution may vary considerably. Usually the aqueous solution is relatively dilute, containing between about 0.5 percent and 10 percent each of the material and sodium bicarbonate. The process of the present invention, however, if effective in treating aqueous brine solutions containing greater or lesser amounts of these inorganic salts.

The alkali metal polyphosphates which are used in the process of this invention are the alkali metal salts of polyphosphoric acid compounds which are soluble in the aqueous brine solution. Suitable polyphosphoric acid compounds include the metaphosphates, the tetraphosphates, the pyrophosphates, the tripolyphosphates and mixtures of two or more of these phosphates. The term "alkali metal" as used herein includes ammonia and the alkali metals sodium, potassium, lithium, rubidium and cesium. Generally, it is preferred to use the sodium salts of the polyphosphoric acid compounds inasmuch as such sodium salts are more readily available than the other alkali metal salts or ammonium salts. However, any of the other alkali metal salts or mixtures of one or more alkali metal salts may be used in the process of this invention.

The alkali metal polyphosphate may be contacted with the aqueous brine solution in any suitable manner. Usually, the polyphosphate is added to the brine solution in the form of a finely divided solid, such as beads, granules, powder and the like, with or without agitation of the solution. The alkali metal polyphosphate may, if desired, be introduced into the brine solution as an aqueous solution. However, due to hydrolysis of polyphosphates in an aqueous solution, such an aqueous solution of the polyphosphate has a limited shelf life and is therefore generally not preferred.

The solution is usually at an elevated temperature when the alkali metal polyphosphate is added thereto. The temperature of the brine solution may vary considerably depending on such considerations as the concentration of the material and sodium bicarbonate in the brine solution, the types and amounts of other salts in the brine, the source of the brine solution and the like. While the temperature of the brine solution is usually above about 90° F., lower temperatures may be used provided, of course, they are not so low as to result in the material and sodium bicarbonate co-crystallizing from the solution prior to the addition of the polyphosphate thereto..

On the other hand, since the rate of hydrolysis of the polyphosphate to orthophosphate increases as the temperature of the aqueous brine solution increases, the temperature of the brine solution should not be so high as to cause complete degradation of the polyphosphate to orthophosphate before crystallization of the desired material from the brine solution is completed. Excellent results have been obtained when finely divided sodium hexametaphosphate is added to brine solutions having a temperature in the range of between about 90° F. and 140° F.

The quantity of alkali metal polyphosphate used to prevent nucleation and crystallization of sodium bicarbonate from the aqueous brine solution during the crystallization of the material therefrom may be varied within wide ranges, depending on such factors as the concentration of sodium bicarbonate in the brine, the processing conditions desired and the like. Thus, amounts as small as about 1 p.p.m., based on the weight of the aqueous brine solution, of certain alkali metal polyphosphates may be used depending on the particular conditions, the bicarbonate concentration in the brine and the quality of the material desired. Generally, it is preferred to provide the aqueous brine solution with at least about 5 p.p.m. of the alkali metal polyphosphate. A concentration of between about 5 and 100 p.p.m. of the polyphosphate in the aqueous brine solution combines effectiveness with economy and is generally preferred. However, amounts in excess of 100 p.p.m. may be used if desired, particularly when the brine solution has a high sodium bicarbonate concentration and/or it is not desired to recover sodium bicarbonate from the brine.

In general, amounts of the polyphosphate in excess of about 100 p.p.m. are not preferred since such amounts tend to prevent sodium bicarbonate crystallization for a period of time dependent on the polyphosphate concentration in the brine solution. The use of amounts above about 100 p.p.m. requires the brine solution to be held for long periods of time before sodium bicarbonate can be crystallized therefrom.

The material is crystallized from the aqueous brine solution, after addition of the alkali metal polyphosphate, by any conventional technique, such as by cooling the brine solution. Excellent results have been obtained by cooling the aqueous brine solution to a temperature within the range of from about 40° to 70° F. Temperatures outside this range may, of course, be used as long as they are effective in crystallizing the material from the solution.

The crystallization of the material from the brine solution may, if desired, be carried out in the presence of seed crystals of the material in order to facilitate more rapid and complete recovery.

When crystallization of the material from the brine solution has proceeded to a desired extent, the solid crystals of the material are removed from the aqueous brine solution by any suitable technique such as for example, filtration, centrifuging or the like. Usually the brine solution is held for at least about 30 minutes while the material is crystallized therefrom in order to maximize recovery.

The addition of the alkali metal polyphosphate to the aqueous brine solution effectively prevents crystallization of sodium bicarbonate from the brine solution while the material is crystallized and recovered therefrom in accordance with the present invention. Consequently, the crystals thus recovered are relatively free of sodium bicarbonate.

Sodium bicarbonate may be crystallized from the remaining aqueous brine solution subsequent to the crystallization and recovery of the material. However, since the alkali metal polyphosphate prevents nucleation and crystallization of sodium bicarbonate, the aqueous solution must be held for a sufficient period of time for the polyphosphate to hydrolyze to the orthophosphate form, which does not prevent crystallization of the bicarbonate. The length of time the solution must be held before bicarbonate may be crystallized and recovered therefrom will, of course, depend on the concentration of polyphosphate in the solution, the temperature of the solution, the concentration of sodium bicarbonate, the type of polyphosphate and the like. The bicarbonate may be crystallized from the aqueous brine solution by any conventional technique, such as by adding sodium bicarbonate seed crystals to the solution and maintaining the temperature of the brine solution at about 70° F. or below. The crystals may be recovered from the aqueous brine solution by filtration, centrifuging or other suitable means.

The following examples are set forth to illustrate, not to limit, the invention, whereby those skilled in the art may understand more fully the manner in which the present invention may be carried into effect. In the instant specification and appended claims, all parts and percentages are by weight unless otherwise indicated.

EXAMPLE I

A quantity of dilute aqueous brine solution containing about 3.4 percent sodium tetraborate decahydrate and about 2.7 percent sodium bicarbonate was introduced into a feed tank at a temperature of about 90° F. Sodium hexametaphosphate was added to the brine solution to provide a concentration of about 20 p.p.m. of sodium hexametaphosphate in the solution. The aqueous brine solution was then introduced into a crystallizer where the temperature of the solution was reduced to about 60° to 65° F. A small amount of sodium tetraborate decahydrate seed crystals were introduced into the crystallizer. The crystallizer was operated for a 5 hour period during which crystals formed throughout the brine solution.

At the end of this 5 hour period, the solution was filtered to provide a filter cake and a filtrate. Samples of the filtrate and the filter cake were taken for analysis and the filtrate was then returned to the crystallizer where it was held, with agitation, at a temperature of about 60° to 65° F. for an additional three-hour period to permit hydrolysis of the hexametaphosphate in the solution. At the end of this 3 hour period, a sample of the solution was again taken and submitted for analysis.

The per cent of of sodium tetraborate decahydrate and sodium bicarbonate contained in each sample was determined and are set forth in Table I.

TABLE I

| Sample | $Na_2B_4O_7 \cdot 10H_2O$ (%) | $NaHCO_3$ (%) |
|---|---|---|
| Aqueous brine solution fed to crystallizer | 3.4 | 2.7 |
| Filter cake (after 5 hours operation) | 86.4 | 0.4 |
| Filtrate (after 5 hours operation) | 2.1 | 2.7 |
| Solution (after 8 hours operation) | 1.3 | 1.7 |

The results of this test show that the addition of an alkali metal polyphosphate, sodium hexametaphosphate, to the aqueous brine solution prevents co-crystallization of sodium bicarbonate with the sodium tetraborate decahydrate so that the tetraborate may be recovered substantially free of bicarbonate.

In addition, the results show that sodium bicarbonate may subsequently be recovered from the brine solution, for the per cent sodium bicarbonate in the solution was markedly reduced upon further extended holding of the solution.

EXAMPLE II

To further demonstrate the effectiveness of the present invention in separately crystallizing sodium tetraborate from an aqueous brine solution also containing bicarbonate, another test was conducted according to the procedure described in Example I.

In this test, an aqueous brine solution containing about 3.2 percent sodium tetraborate decahydrate and 3.1 percent sodium bicarbonate was introduced into the feed tank at a temperature of between 125° and 130° F. Sodium hexametaphosphate was added to the aqueous brine solution to provide a concentration of 20 p.p.m. of the hexametaphosphate in the aqueous solution. The solution was then introduced into the crystallizer and the temperature of the solution was reduced to about 60° to 65° F. A small amount of sodium tetraborate decahydrate seed crystals was then added to the brine solution. The solution was continuously agitated in the crystallizer, as in Example I, for a period of 5 hours, at which time the slurry was filtered to provide a filter cake and a filtrate. A sample was taken of the filtrate and the filter cake, and the filtrate returned to the crystallizer where it was retained, with agitation, for an additional 2 hours in the presence of sodium bicarbonate seed crystals. A sample of the solution was then taken at that time.

In order to provide a basis for comparison, this test was repeated with the exception that no alkali metal polyphosphate was added to the aqueous brine solution.

The per cent of sodium tetraborate decahydrate and sodium bicarbonate contained in each sample was determined and are set forth in Table II.

The results of these tests clearly indicate the effectiveness of the present invention. As shown in Table II, when a polyphosphate is not added to the aqueous brine solution, a substantial amount of bicarbonate crystallizes with the tetraborate. In contrast, when an alkali metal polyphosphate, sodium hexametaphosphate, was added to the aqueous solution, substantially no bicarbonate co-crystallized with the tetraborate decahydrate.

EXAMPLE III

The procedure described in Example I was again repeated with the exceptions that the aqueous brine solution contained about 3.4 percent sodium tetraborate decahydrate and about 3.4 percent sodium bicarbonate, and the concentration of sodium hexametaphosphate in the aqueous brine solution was 10 p.p.m. After agitating the solution in the crystallizer for 6 hours at a temperature of about 60° to 65° F., the solution was filtered to separate and recover the crystals which had formed in the brine solution. Analysis of the filter cake showed it to contain 82.2 percent sodium tetraborate decahydrate and about 1.3 percent sodium bicarbonate. Analysis of the filtrate showed it to contain 1.7 percent sodium tetraborate decahydrate and 3.4 percent sodium bicarbonate.

The results of this test shows that even when the concentration of alkali metal polyphosphate in the brine solution is maintained at relatively low levels, sodium tetraborate decahydrate may be separately crystallized from solutions which also contain bicarbonate.

EXAMPLE IV

To determine the effect of alkali metal polyphosphate on the crystallization of glaubers salt from a brine, the following experiments were conducted. A brine containing glaubers salt having an initial temperature of 90° F. was cooled to the various crystallization temperatures indicated below, held at such temperatures for 30 minutes and filtered to remove the crystals. The crystals were analyzed for $NaHCO_3$ content. The initial brine consisted of:

| | |
|---|---|
| $NaHCO_3$ | 2.7% |
| $Na_2SO_4$ | 18.08% |
| NaCl | 5.9% |
| $H_2O$ | 72.6% |

The results of the tests are shown in the table below.

| Crystallization Temperature | Percent $NaHCO_3$ In Crystals |
|---|---|
| 60°45 | 1.24 |
| 40° | 1.60 |

The above procedure was repeated but 37 p.p.m. of sodium hexametaphosphate was added prior to cooling the brine. The results are shown below:

| Crystallization Temperature | Percent $NaHCO_3$ In Crystals |
|---|---|
| 60° F. | 0.38 |
| 40° F. | 0.72 |

EXAMPLE V

To demonstrate the co-crystallization of sodium sulfate and borax from a solution containing the same, the following experiment was conducted. A solution was obtained having the following contents:

| | |
|---|---|
| NaCl | 15.7% |
| KCl | 3.3% |
| $Na_2SO_4$ | 6.9% |
| $Na_2B_4O_7$ | 1.7% |
| $NaHCO_3$ | 2.5% |
| $H_2O$ | 69.9% |

This solution was maintained at a temperature of 105° F. while 30 p.p.m. of sodium hexametaphosphate was added. The solution was then cooled to 55° F. to crystallize the material. The precipitate was filtered and water washed to remove traces of liquid $Na_2CO_3$ and $NaHCO_3$. Analysis of the crystals was as follows:

| | |
|---|---|
| $NaHCO_3$ | 0.07% |
| $Na_2SO_4$ | 35.01% |
| $Na_2B_4O_7$ | 5.91% |

This same procedure was repeated but without the addition of the sodium hexametaphosphate. The crystals were analyzed and found to contain approximately 7.0 percent $NaHCO_3$. Thus, demonstrating that borax and glaubers salt can be co-crystallized substantially free of bicarbonate from solutions containing the same.

It will be understood that while the specific examples, which are provided to illustrate the invention, show the addition of sodium hexametaphosphate to an aqueous brine solution, alkali metal polyphosphates other than sodium hexametaphosphate may be used in the process of the present invention. Thus, as described hereinabove, alkali metal salts of metaphosphate, tetraphosphates, pyrophosphates, tripolyphosphates and mixtures of two or more such polyphosphates are effective in the process of this invention. However, sodium hexametaphosphate is readily available commercially and is therefore preferred. In addition, it will be apparent to those skilled in the art that concentrations of the polyphosphate in the brine solution greater than the concentrations used in the specific examples are effective in preventing the nucleation and crystallization of sodium bicarbonate from aqueous solutions while the material consisting of at least one salt selected from the group consisting of sodium tetraborate and sodium sulfate is crystallized therefrom.

While the present invention has been described with respect to what at present are considered to be preferred embodiments thereof, it will be understood that changes, substitutions, modifications and the like may be made therein without departing from the scope of the invention as defined in the appended claims.

What is claimed is:

1. A process of crystallizing a material consisting of at least one salt selected from the group consisting of sodium tetraborate and sodium sulfate from an aqueous solution containing the material and sodium bicarbonate which comprises
    adding to said aqueous solution at a temperature above that at which the material and sodium bicarbonate co-crystallize from said solution an amount of alkali metal salts of polyphosphoric acids which are soluble in said aqueous solution sufficient to provide a concentration of at least about 5 p.p.m. of said salts and to prevent the nucleation and crystallization of sodium bicarbonate,
    cooling said solution to a temperature at which said material crystallizes substantially free of sodium bicarbonate and recovering said crystallized material from said solution.

2. The process as defined in claim 1 in which said alkali metal polyphosphate is an alkali metal salt of a polyphosphoric acid compound selected from the group consisting of metaphosphates, tetraphosphates, pyrophosphates, tripolyphosphates and mixtures thereof.

3. The process as defined in claim 1 in which said alkali metal polyphosphate is added to aqueous brine solution at a temperature of at least about 90° F. to provide a concentration of between about 5 to 100 p.p.m. of said polyphosphate in said solution and the solution is then cooled to a temperature of within the range of from about 40° to 70° F. to crystallize said material from said solution.

4. The process as defined in claim 3 in which said alkali metal polyphosphate is sodium hexametaphosphate.

5. The process as defined in claim 3 in which seed crystals of the material are added to the aqueous brine solution.

6. The process as defined in claim 1 in which said crystals of the material are removed from said solution and sodium bicarbonate is thereafter crystallized from the solution.

7. The process as defined in claim 6 in which said sodium bicarbonate is crystallized from said solution by maintaining the temperature of said solution below about 70° F.

8. The process as defined in claim 6 in which said sodium bicarbonate is crystallized from said solution in the presence of added sodium bicarbonate seed crystals.

9. A process of crystallizing sodium sulfate from an aqueous solution containing the same and sodium bicarbonate which comprises adding to said aqueous solution at a temperature above that at which the sodium sulfate and sodium bicarbonate co-crystallize from said solution an amount of alkali metal salts of polyphosphoric acids which are soluble in said aqueous solution sufficient to provide a concentration of at least about 5 p.p.m. of said salts and to prevent the nucleation and crystallization of sodium bicarbonate, cooling said solution to a temperature at which said sodium sulfate crystallizes substantially free of sodium bicarbonate and recovering said crystallized sodium sulfate from said solution.

10. A process of crystallizing sodium tetraborate from an aqueous solution containing the same and sodium bicarbonate which comprises adding to said aqueous solution at a temperature above that at which the sodium tetraborate and sodium bicarbonate co-crystallize from said solution an amount of alkali metal salts of polyphosphoric acids which are soluble in said aqueous solution sufficient to provide a concentration of at least about 5 parts per million of said salts and to prevent the nucleation and crystallization of sodium bicarbonate and cooling said solution to a temperature at which said sodium tetraborate crystallizes substantially free of sodium bicarbonate and recovering said crystallized sodium tetraborate from said solution.

* * * * *

UNITED STATES PATENT OFFICE
CERTIFICATE OF CORRECTION

Patent No. 3,653,847          Dated April 4, 1972

Inventor(s) Arthur E. Ableson

It is certified that error appears in the above-identified patent and that said Letters Patent are hereby corrected as shown below:

Column 1, line 37, "colled" should read -- cooled --

Column 4, line 42 should read -- Solution (after 8 hours operation) -- line 43, delete "7"

Line 44, delete "operation)"

(continued on page two)

UNITED STATES PATENT OFFICE
CERTIFICATE OF CORRECTION

Patent No. 3,653,847     Dated April 4, 1972

Inventor(s) Arthur E. Ableson

It is certified that error appears in the above-identified patent and that said Letters Patent are hereby corrected as shown below:

Page two

Column 5, after line 11, insert --

Table II

| Sample | Concentration of Sodium Hexametaphosphate (ppm) | $Na_2B_4O_7 \cdot 10H_2O$ (%) | $NaHCO_3$ (%) |
|---|---|---|---|
| Aqueous brine solution fed to crystallizer | 0 | 3.2 | 3.1 |
|  | 20 | 3.2 | 3.1 |
| Filter cake, after five hours operation | 0 | 50.8 | 23.9 |
|  | 20 | 84.7 | 0.4 |
| Filtrate, after five hours operation | 0 | 2.1 | 2.6 |
|  | 20 | 2.1 | 3.1 |
| Solution, after seven hours operation | 0 | 1.5 | 1.9 |
|  | 20 | 1.3 | 2.1 |

Column 5, line 53, "18.08%" should read -- 18.8% --

Column 6, line 18, "colled" should read -- cooled --

Signed and sealed this 22nd day of August 1972.

(SEAL)
Attest:

EDWARD M. FLETCHER, JR.          ROBERT GOTTSCHALK
Attesting Officer                 Commissioner of Patents